Dec. 5, 1939.   G. H. MIEHER   2,182,345
BICYCLE
Filed Nov. 3, 1937
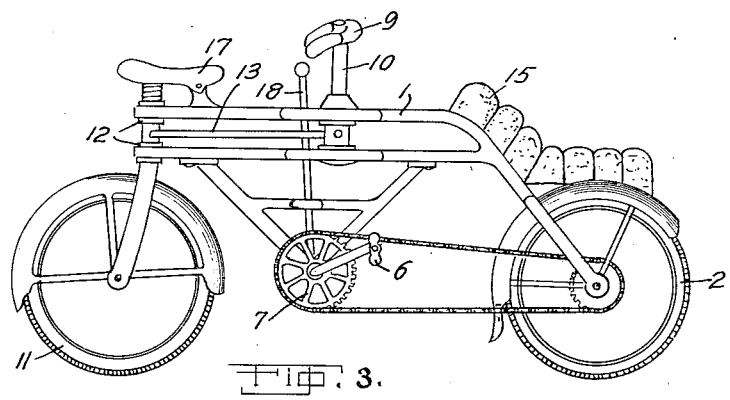
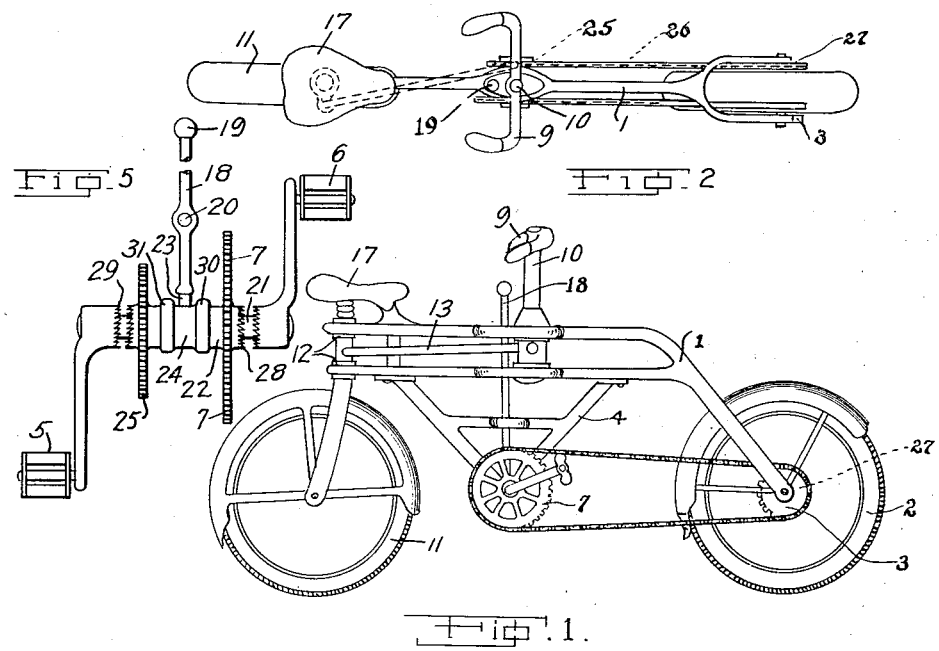
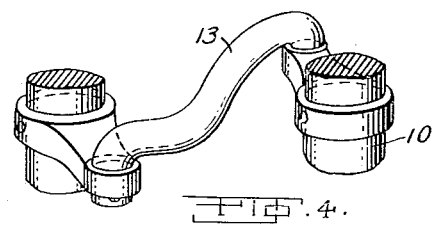
Gustav H. Mieher
INVENTOR
BY G. B. McCall
ATTORNEYS Patented Dec. 5, 1939

2,182,345

UNITED STATES PATENT OFFICE 2,182,345

BICYCLE

Gustav H. Mieher, Carlinville, Ill.

Application November 3, 1937, Serial No. 172,510

1 Claim. (Cl. 280—238)

My invention relates to bicycles and has for an object to provide a bicycle upon which weight carried thereon may be equalized over its base of support with better advantage.

An object of my invention is further to provide a construction which will not throw the weight of an added load upon the handle bars of the bicycle.

A further object of my invention is to provide a construction of a bicycle which will permit a load of luggage or an extra passenger to ride to the front and down out of the line of sight of the individual who is propelling the bicycle and to throw such weight over the drive wheel and not directly upon the wheel that is operatively connected with the bicycle handle bars.

I attain the purposes of my invention by the bicycle described in the annexed specification, recited in the claim, and illustrated in the accompanying drawing wherein like reference numerals indicate like parts in the several figures:

Referring to the figures:

Fig. 1 is a side elevation of my bicycle.

Fig. 2 is a top view of the same.

Fig. 3 is a side view of my bicycle illustrating thereon a front seat for an extra passenger.

Fig. 4 is a detail illustrating the steering length connections between the handle bar and the upright steering yoke for the rear wheel.

Fig. 5 is a detail illustrating a gear shift construction which enables the rider to shift from one speed to another.

Referring to the preferred construction of my bicycle, it will be noted that an outstanding feature of this invention is the provision whereby the frame therefor is constructed and arranged to permit the drive wheel to operate in front and the steering wheel controlled by the handle bars pivotally mounted adjacent the top central portion of the frame and controllably connected with the rearwardly disposed steering wheel by a steering link.

This construction has advantages that may not be found in the well known bicycle. For instance, when an extra passenger is carried on this bicycle, he may be seated in the comfortable front seat without throwing the extra weight directly upon the handle bars and in a position where the rider can easily and conveniently see over the extra passenger.

Thus, in explaining the features of my bicycle, it will be noted that frame member 1 carries the drive wheel 2 at the forward end with the driven sprocket 3; while a central portion 4 of frame 1 carries pedals 5 and 6 and a driving sprocket wheel 7 which is drivingly connected with sprocket 3 by a chain 8.

Handle bars 9 are pivotally mounted in an upright position on their shank 10 which is preferably supported by ball bearings in frame 1. A steering wheel 11 is operatively supported in frame 1 at the rearward end thereof as it is pivotally secured thereto in upright bearing 12 of frame 1.

Handle bars 9 are controllably connected with steering wheel 11 by a steering link 13 which is constructed in a manner permitting the same to pivotally turn steering wheel 11 to the right when handle bars 9 are turned to the left so that the bicycle may be caused to turn to the left by such adjustment of the steering wheel position.

In like manner when the handle bars are turned to the right, the steering wheel will turn to the left so that the bicycle responding to this adjustment of the handle bars will be caused to turn to the right.

When it is desired to carry extra luggage on this bicycle it may be carried over the forward drive wheel in a detachable basket not shown; while an extra passenger may comfortably and conveniently ride at the forward end in a seat 15 with feet resting upon foot rests (not shown).

It is obvious in a study of the novelty of my invention, that the same principle involving the construction of the full sized bicycle may also be used as a sidewalk vehicle in smaller size for children.

Certain minor details of construction of my bicycle may be changed in design without departing from the spirit of my invention and it is obvious that the frame design may be modified within the scope of the invention, but a practical operative construction of this invention is illustrated in the drawing wherein it is shown that the rider sitting on seat 17 is approximately the only weight supported over the steering wheel 11 and yet when there is no extra passenger, there is a sufficient portion of the driver's weight carried to the front drive wheel 2 to provide ample traction for ordinary riding purposes, while any extra weight that may be carried on the bicycle in addition to the rider will be carried, not on the steering wheel 11, but over the forward drive wheel 2 where additional traction may be then secured without having the actual weight thrown on the steering wheel 11.

It will be noted in Figures 2 and 5 that I have provided for the convenience of a gear shift with my bicycle whereby it will be possible to shift the gear from a high speed to a low speed or to whatever speeds may be desired for the bicycle.

This gear shift arrangement will thus make it possible when suddenly coming to a steep hill to shift the power of the pedal of the rider from the sprocket on one side of the middle frame over to the sprocket on the other side which can be a smaller sprocket, making for less speed but more power to negotiate such a steep hill.

With this arrangement, it may be seen that with lever 18 mounted on central frame 4 the rider may shift the gear by moving lever 18 to the right or left as he holds knob 19, this lever being pivoted on central portion 4 of frame 1 by a supporting pin 20.

Thus, the shaft 21 on which pedals 5 and 6 are mounted would in such case be provided with the gear shift plate 22 which is slidably adjustable on shaft 21 by shifting lever 18 on its pivotal support 20. Thus sprocket wheels 7 and 25 unlike in diameter may be shifted respectively by lever 18 to a position of engagement with pedals 6 and 5 respectively as desired for a change in speed. The lower end 23 of lever 18 rides in groove 24 of plate 22.

Gear shift drive plate 22 may be thus shifted to right or left for the purposes of engaging with the sprocket wheel 7 on one side or the sprocket wheel 25 on the other side if the need for more power arises; in which case sprocket wheel 25 would cause drive chain 26 to run the drive wheel 2 by a driven sprocket 27 on the opposite side of drive wheel 2. It will be noted on gear shift drive plate 22 that each of its ends are shaped to respectively define clutch teeth 28 on one end and 29 on the other by which this plate may be alternately and operatively connected with sprocket wheel 7 on one side and with sprocket wheel 25 on the other side when it is desired to change the speed or power of the bicycle if applied to pedals 5 and 6.

It will be noted further that ring members 30 and 31 on sprocket drive plate 22 function to permit shift lever 18 at its lower end to constantly register between these rings and permit the sprocket drive plate 22 to be shifted by shifting lever 18.

It will be particularly noted in connection with my invention that when riding my bicycle, it is not desired to have an excessive weight on the front traction wheel under ordinary riding conditions nor is it desired to have an excessive weight upon the steering wheel that is controlled by the handle bars and by this invention, I make it possible to make it easier riding by limiting the amount of weight placed upon the forward drive wheel and thus more uniformly distributing such weight; and yet when extra weight is added either in the front seat or on a luggage carrier to the front, such weight is placed as will be noted in the drawing just where it will be needed to gain any additional traction that may be required to pull it.

Thus, the advantages of my invention have been set forth, and having thus described the nature of my device, what I claim is:

In a bicycle having a frame shaped to operatively and pivotally support a steering wheel at the rear thereof, steering handle bars operatively connected with said frame forward of the steering wheel and rearward of the front end of the frame which is shaped to define a wheel supporting yoke, a steering link operatively connecting said handle bar with said rear steering wheel; a pair of oppositely disposed sprocket wheels of unlike diameter independently supported on a common shaft, a drive wheel carried by said front yoke of the frame and provided with a sprocket wheel on each side thereof within said yoke, a sprocket chain establishing driving connection between each of said drive wheel sprockets respectively and said unlike diameter sprocket wheels respectively, a change speed clutch mechanism carried by said common shaft supporting said unlike diameter sprockets and adapted to be operatively and alternately engaged with said unlike diameter sprockets, shifting lever means pivotally supported in said frame and slidably shifting said change speed clutch mechanism and driving pedals operatively connected with said common shaft.

GUSTAV H. MIEHER.